(12) United States Patent
Li et al.

(10) Patent No.: US 6,873,757 B2
(45) Date of Patent: Mar. 29, 2005

(54) MULTIPLE OPTICAL SWITCHES USING REFRACTIVE OPTICS

(75) Inventors: Shifang Li, Pleasanton, CA (US); Qing Shao, Santa Clara, CA (US)

(73) Assignee: Oplink Communications, Inc., San Jose, CA (US)

( * ) Notice: Subject to any disclaimer, the term of this patent is extended or adjusted under 35 U.S.C. 154(b) by 165 days.

(21) Appl. No.: 10/158,182

(22) Filed: May 31, 2002

(65) Prior Publication Data

US 2003/0223680 A1 Dec. 4, 2003

(51) Int. Cl.$^7$ .............................. G02B 6/35; G02B 26/08
(52) U.S. Cl. ........................................... 385/22; 385/25
(58) Field of Search ............................... 385/16, 22, 25

(56) References Cited

U.S. PATENT DOCUMENTS 4,322,126 A * 3/1982 Minowa et al. ............... 385/18

6,215,919 B1    4/2001 Li et al.

* cited by examiner

Primary Examiner—Akm Enayet Ullah
Assistant Examiner—Jerry T Rahll
(74) Attorney, Agent, or Firm—Fish & Richardson P.C.

(57) ABSTRACT

A mechanical optical switch includes a port, a first lens element, a free beam path, and a beam guiding element. The port is adapted to receive a first group of optical fibers. The first lens element has an optical axis and is positioned in front of the first group of optical fibers. The free beam path couples light beams from a second group of optical fibers to the first lens element such that the light beams are coupled to the first group of optical fibers in a first coupling arrangement. The beam guiding element is configured to move into and out of the free beam path. Moving the beam guiding element into the free beam path shifts the light beams by an offset and rotates the light beams by an angle such that the light beams propagate to the first lens element and are coupled into the first group of optical fibers in a second coupling arrangement.

30 Claims, 7 Drawing Sheets

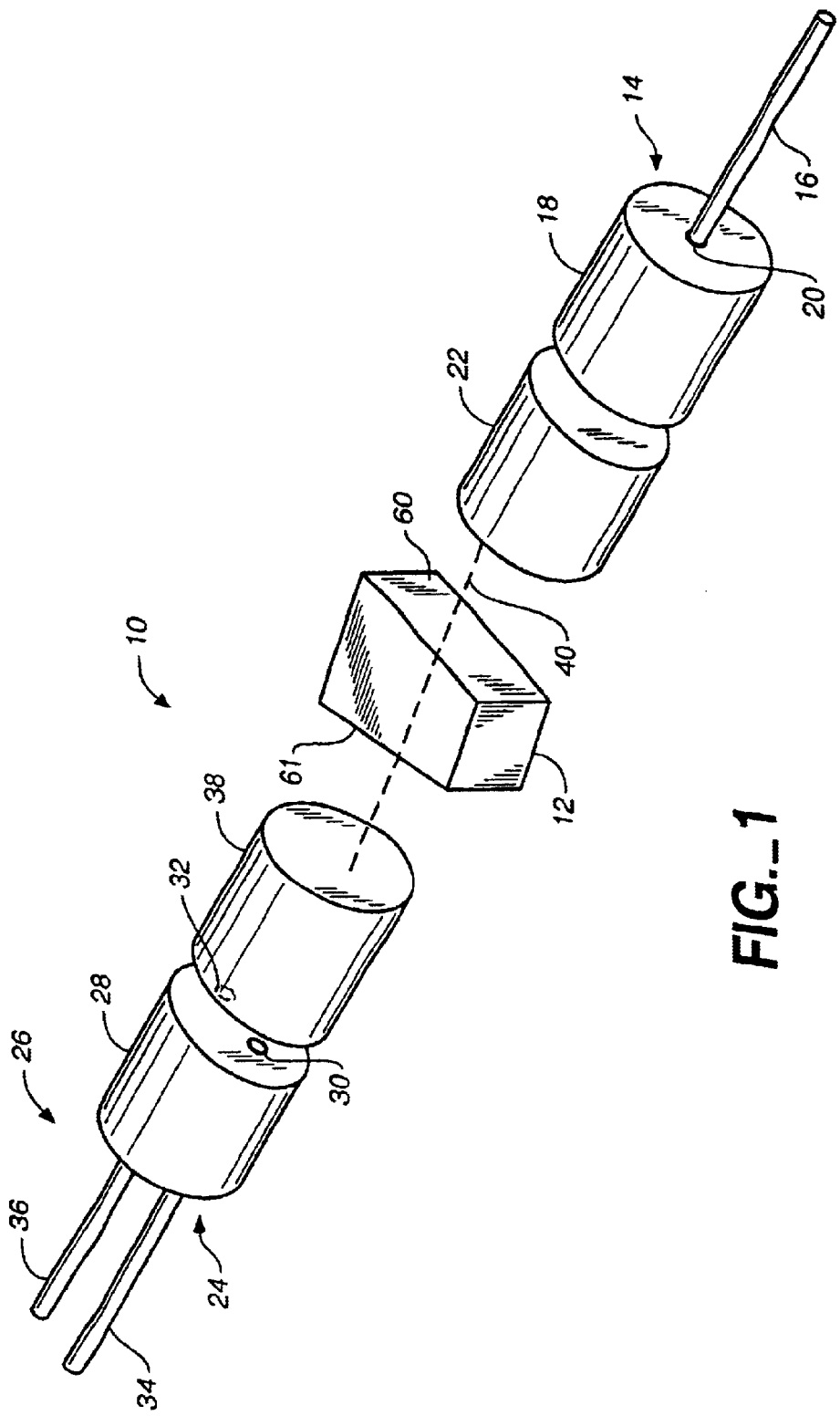
FIG._1

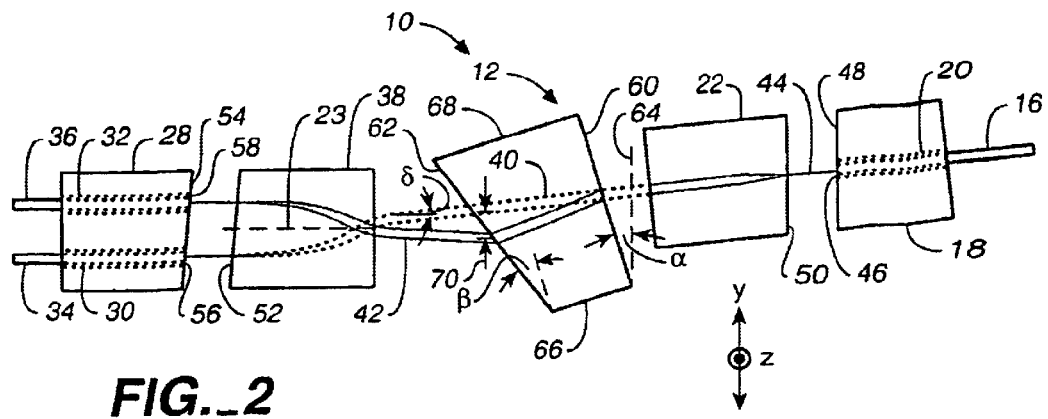
FIG._2
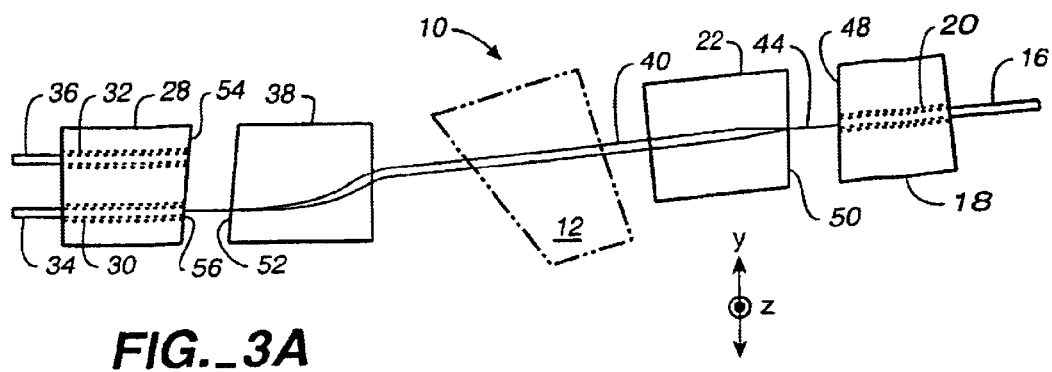
FIG._3A
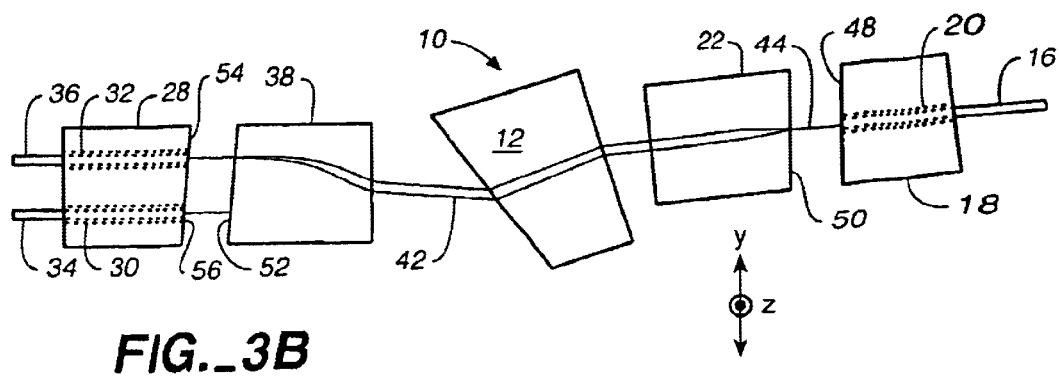
FIG._3B

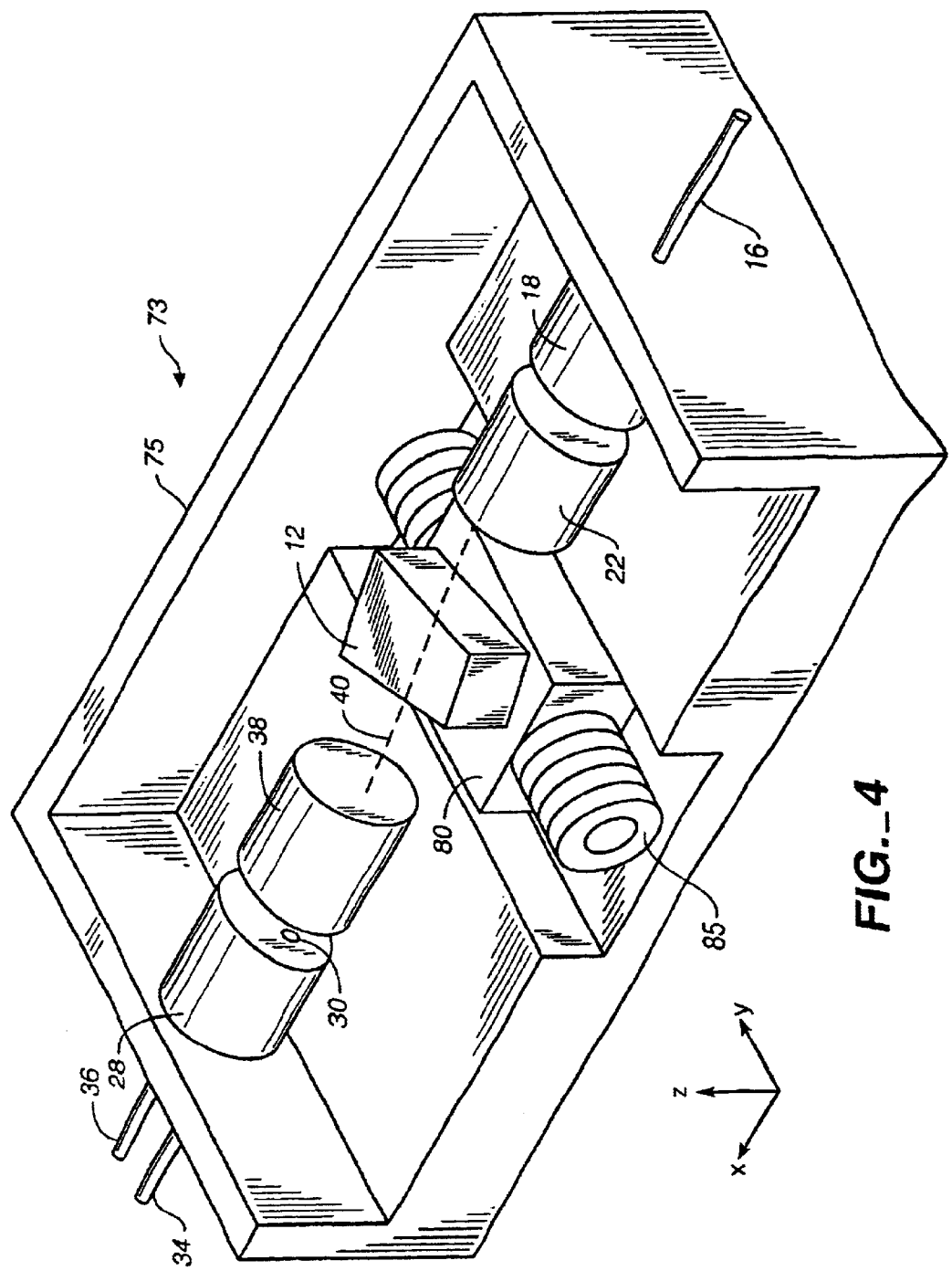
FIG._4

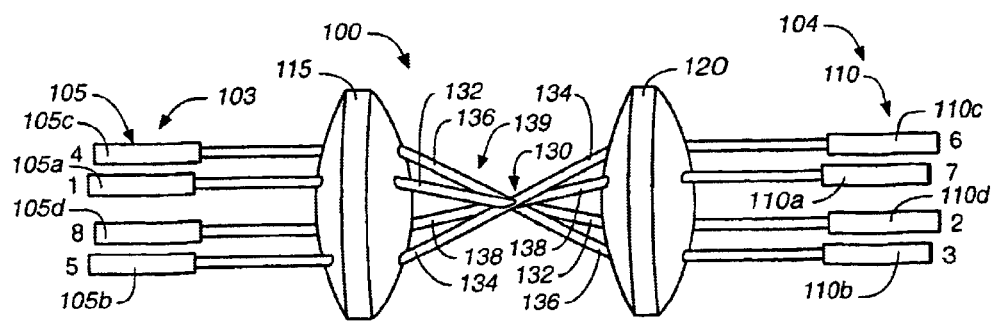
FIG._5A
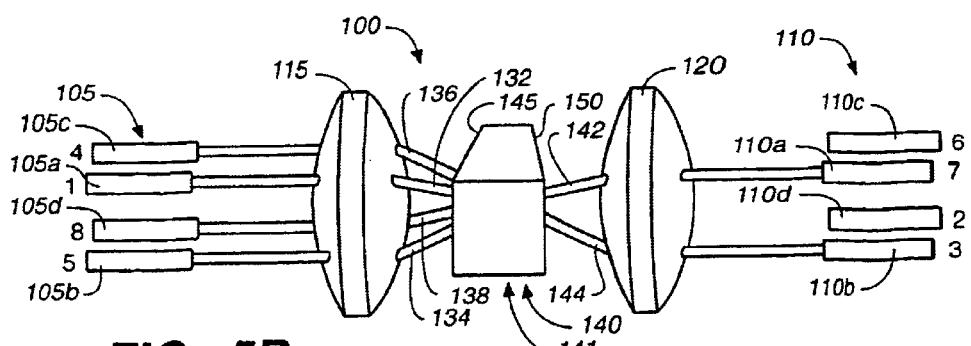
FIG._5B

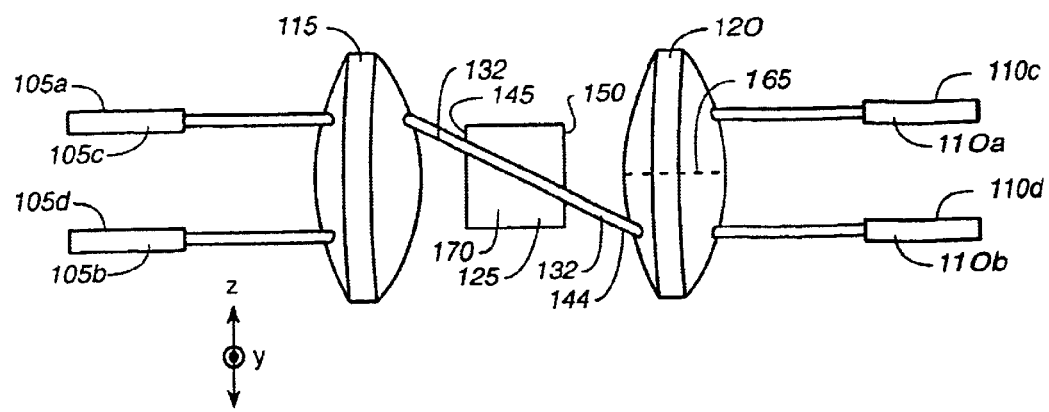
FIG._6A
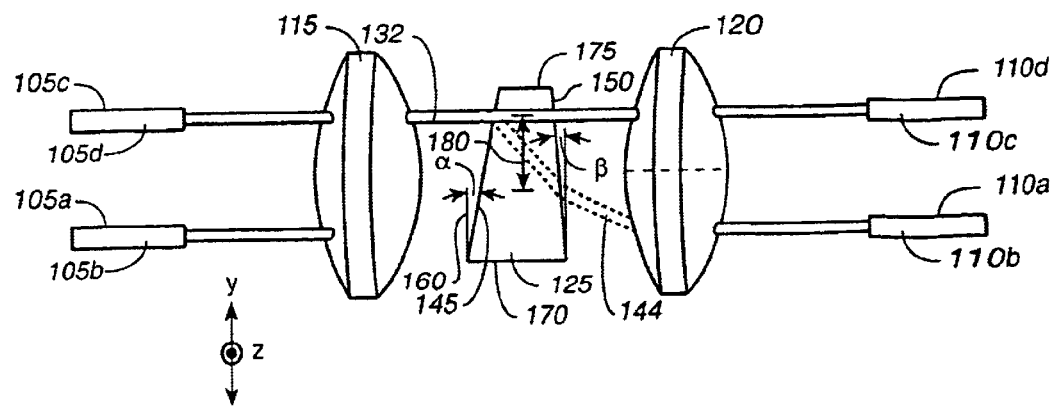
FIG._6B

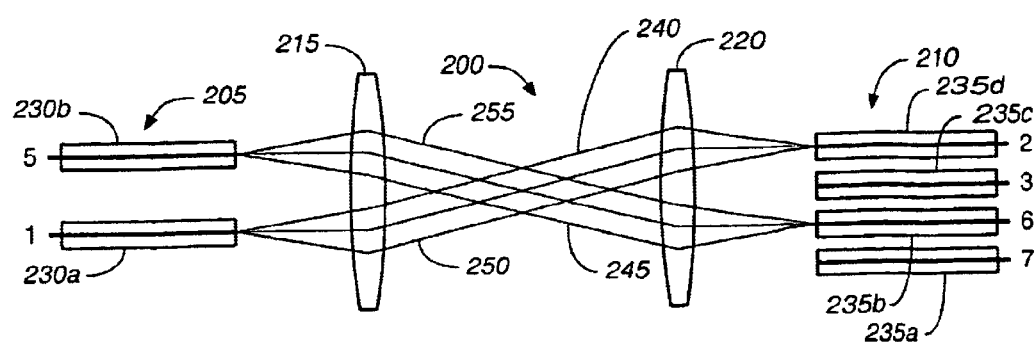
FIG._7A
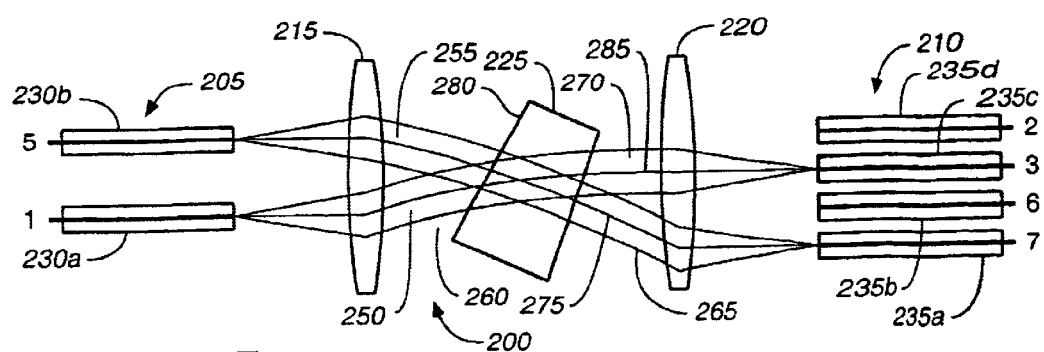
FIG._7B

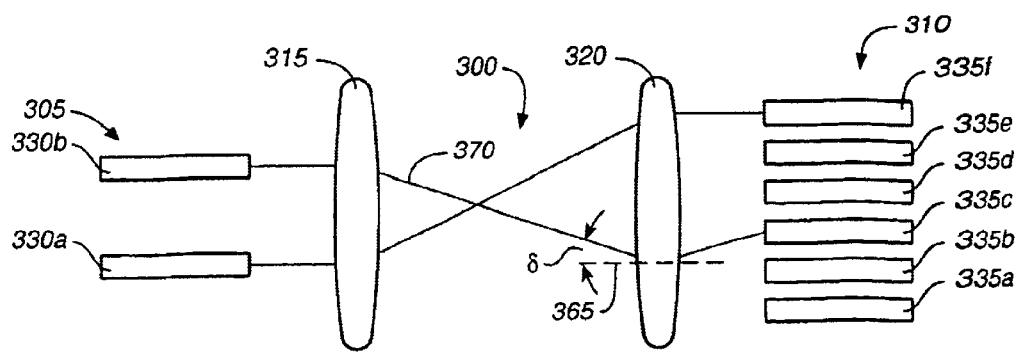
FIG._8A
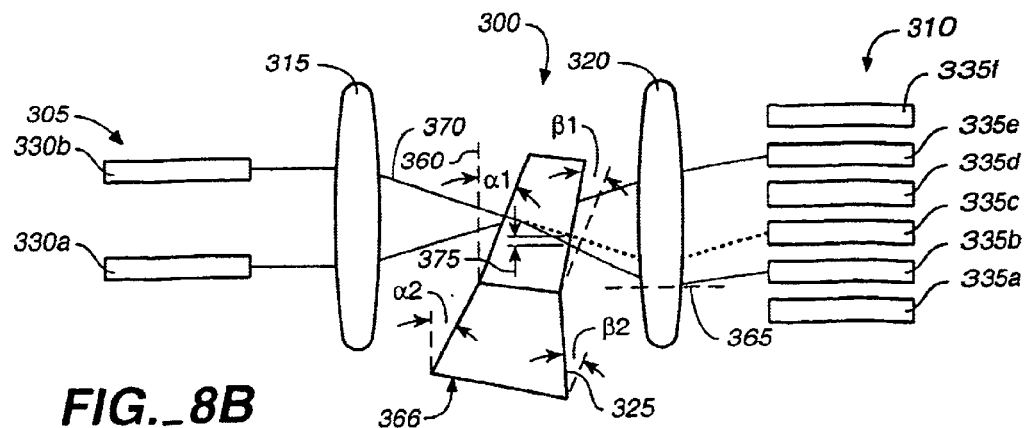
FIG._8B
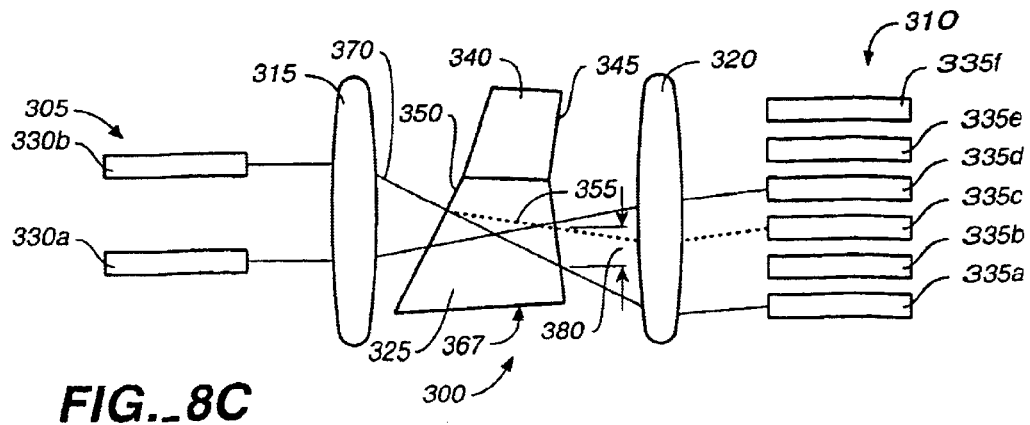
FIG._8C

MULTIPLE OPTICAL SWITCHES USING REFRACTIVE OPTICS

TECHNICAL FIELD

This invention relates generally to optical technology to optical switches.

BACKGROUND

Mechanical optical switches are used in optical systems to switch a light beam between an input fiber and one or more output fibers. For example, mechanical optical switches are used in optical communication systems to connect and disconnect transmission paths to route light beams modulated with information. Mechanical optical switches also can be used to pulse a light source, e.g., a laser, or perform other functions with modulated or unmodulated light beams.

One type of mechanical optical switch is a 1×2 optical switch, which provides optical switching between one input port and two output ports. It is known that 1×2 optical switches using refractive optics are very reliable, have small insertion loss, and are easy to manufacture. An example of a 1×2 optical switch is described in U.S. Pat. No. 6,215,919 to Li et al., the contents of which are incorporated herein by reference. The 1×2 optical switch has been used widely in the telecommunications industry, such as for protection switching and tag switching. The 1×2 optical switch also has been used to build larger dimension switches, such as 1×4 and 1×8 optical switches. In some cases, application designers need to integrate multiple 1×2 optical switches together to reduce power consumption and/or physical space used.

SUMMARY

In one general aspect, the invention provides a mechanical optical switch that includes a port, a first lens element, a free beam path, and a beam guiding element. The port is adapted to receive a first group of optical fibers. The first lens element has an optical axis and is positioned in front of the first group of optical fibers. The free beam path couples light beams from a second group of optical fibers to the first lens element such that the light beams are coupled to the first group of optical fibers in a first coupling arrangement. The beam guiding element is configured to move into and out of the free beam path. Moving the beam guiding element into the free beam path shifts the light beams by an offset and rotates the light beams by an angle such that the light beams propagate to the first lens element and are coupled into the first group of optical fibers in a second coupling arrangement.

Embodiments of the mechanical optical switch may include one or more of the following features. For example, the first group of optical fibers may include two or more fibers and the second group of optical fibers may include two or more fibers.

The first group of optical fibers may include four fibers and the second group of optical fibers may include two fibers. The free beam path may include two beam paths formed between the second group of optical fibers and two fibers of the first group of optical fibers. When the beam guiding element is moved into the free beam path, the two beam paths are shifted to two different fibers of the first group of optical fibers.

The first group of optical fibers may include four fibers and the second group of optical fibers may include two fibers. The free beam path may include four beam paths formed between the second group of optical fibers and the first group of optical fibers. When the beam guiding element is moved into the free beam path, the four beam paths are shifted such that two beam paths are formed between two of the second group of fibers and two different fibers of the first group of optical fibers.

The beam guiding element may be a wedge prism having a first facet and a second facet and the light beams enter the wedge prism in the first facet and exit the wedge prism through the second facet. The first facet may be oriented at a first angle with respect to an optical axis of the mechanical optical switch and the second facet may be oriented at a second angle with respect to the first facet. The free beam path may be inclined at an angle with respect to an optical axis of the mechanical optical switch. The first lens element may be a graded index lens.

The mechanical optical switch may further include a second lens element positioned in front of the second group of optical fibers for collimating the light beams. The second lens element may be a graded index lens.

The mechanical optical switch may further include a mechanical actuator, an electromechanical actuator, a magnetic actuator, or a piezoelectric actuator configured to move the beam guiding element The beam guiding element may be a segmented wedge prism that includes a first segment and a second segment that is joined to the first segment. Moving the first segment of the beam guiding element into the free beam path shifts the light beams by the offset and rotates the light beams by the angle such that the light beams propagate to the first lens element and are coupled into the first group of optical fibers in the second coupling arrangement. Moving the second segment of the beam guiding element into the free beam path shifts the light beams by a second offset and rotates the light beams by a second angle such that the light beams propagate to the first lens element and are coupled into the first group of optical fibers in a third coupling arrangement.

The first segment may include a first input facet and a first output facet, and the second segment may include a second input facet and a second output facet. The first input facet may be oriented at a first angle with respect to a normal to an optical axis of the first lens element and the first output facet may be inclined at a second angle with respect to the first input facet.

The second input facet may be oriented at a third angle with respect to the normal to the optical axis of the first lens element and the second output facet may be inclined at a fourth angle with respect to the second input facet. The first angle and the third angle may be different.

In another general aspect, the invention provides a method for switching between a first arrangement of light beams and a second arrangement of light beams formed between optical fibers. The method includes forming a free beam path and moving a beam guiding element into the free beam path. The free beam path includes a first arrangement of light beams passing from a group of optical input fibers to a first group of optical output fibers. Moving the beam guiding element to the free beam path shifts the light beams by an offset and rotates the light beams by an angle such that the light beams are coupled to a second group of optical output fibers in a second coupling arrangement.

Embodiments of the switching may include one or more of the following features. The beam guiding element may be moved into the free beam path to shift the light beams by a second offset and rotate the light beams by a second angle such that the light beams are coupled to a third group of optical output fibers in a third coupling arrangement. Moving the beam guiding element into the free beam path may include moving a wedge prism.

Moving the beam guiding element may further include activating a mechanical actuator, an electromechanical actuator, a magnetic actuator, or a piezoelectric actuator to move the beam guiding element.

The mechanical optical switch provides considerable advantages. For example, the switch allows integration of multiple 1×2 optical switches with the advantages of refractive optics.

The details of one or more embodiments of the invention are set forth in the accompanying drawings and the description below. Other features, objects, and advantages of the invention will be apparent from the description, the drawings, and the claims.

DESCRIPTION OF DRAWINGS

FIG. 1 is an isometric view of optical components of a mechanical optical switch.

FIG. 2 is a top plan view of the optical parts of the switch of FIG. 1 showing the free and guided beam paths.

FIGS. 3A and 3B are top plan views illustrating the operation of the mechanical optical switch of FIG. 1.

FIG. 4 is an isometric view of a mechanical optical switch implementing a wedge prism.

FIG. 5a illustrates a perspective side view of a mechanical optical switch between two groups of fibers in a free beam condition in which the two groups of fibers are coupled in a first coupling arrangement.

FIG. 5b illustrates a side view of the mechanical optical switch of FIG. 5a in which the wedge prism interrupts the free beam path and switches the beam path to a second coupling arrangement.

FIGS. 6a and 6b are a side view and a top view, respectively, of the mechanical optical switch of FIG. 5a showing particular details of a single beam path.

FIG. 7a illustrates a mechanical optical switch in a free beam condition.

FIG. 7b illustrates the mechanical optical switch of FIG. 7a with a wedge prism interrupting the free beam path and switching the beam path between optical output fibers.

FIGS. 8a–c are side views of an additional embodiment of a mechanical optical switch having a multi-faceted wedge prism.

Like reference symbols in the various drawings indicate like elements.

DETAILED DESCRIPTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of particular optical switches having specific components having a specific configuration. Similarly, the present invention will be described in terms of particular optical switch components having specific relationships, such as distances or angles between components. However, one of ordinary skill in the art will readily recognize that this method and system will operate effectively for other components having similar properties, other configurations, and other relationships between components.

FIG. 1 shows an arrangement of the optical components of a mechanical optical switch 10 equipped with a beam guiding element in the form of a wedge prism 12. The wedge prism 12 can be constructed from a material having a uniform refractive index n, such as, for example, quartz or glass. Positioned on a first side 60 of the wedge prism 12 is an input port 14 coupled to a signal or input fiber 16. The input port 14 is, for example, a glass capillary 18 having a bore or hole 20 for inserting the input fiber 16. A lens element 22, such as a graded index ("GRIN") lens, is positioned in front of the capillary 18.

Positioned on a second side 61 of wedge prism 12 is a first output port 24 and a second output port 26. A glass capillary 28 with two bores 30, 32, for example, may serve the function of output ports 24, 26. A first optical fiber 34 is inserted into the bore 30 and a second optical fiber 36 is inserted into the bore 32. The fibers 34 and 36 are the output fibers of the mechanical optical switch 10.

A lens element 38 is positioned between the capillary 28 for focusing light into the cores of output fibers 34, 36. The lens element 38 may be, for example, a GRIN lens. Typically, only one lens element 38 is used for both output fibers 34, 36 because it reduces the size and weight of the optical switch and provides optical advantages, as discussed below.

A free beam path 40 is defined between the input fiber 16 and the first fiber 34. The free beam path 40 is the path along which light propagates between input fiber 16 and output fiber 34 when the wedge prism 12 is removed from the path. The wedge prism 12 can be moved in such a way that in one position the wedge prism 12 does not intersect free beam path 40 and in a second position (i.e., a switched or active position) intersects the free beam path 40, producing a guided beam path 42.

Referring to FIGS. 1 and 2, specifically, when the wedge prism 12 is removed from the free beam path 40, a light signal 44 issuing from the input fiber 16 is coupled from fiber end 46 and collimated by the lens element 22 to propagate along free beam path 40, as indicated in dashed lines. The free beam path 40 is inclined at an angle, $\delta$, with respect to an optical axis 23 of the lens element 38. Thus, the lens element 38 receives the light signal 44 at angle of incidence equal to the angle $\delta$ and focuses it into the core of the first fiber 34, thereby coupling the light signal 44 to the first fiber 34.

In order to prevent back-reflection of signal 44, an output face 48 of the glass capillary and the fiber end 46 are machined at a slant, e.g., between approximately 6 to 10°. An input face 50 of the lens 22 exhibits a reverse slant at approximately the same angle. In a similar manner, a back face 52 of the lens element 38 and a front face 54 of capillary 28 as well as fiber ends 56 and 58 of fibers 34 and 36 are also machined at reverse slants. This method of preventing back reflection is well-known in the art, and may be used in any of the mechanical optical switches described herein.

When the wedge prism 12 is placed in the free beam path 40, the light signal 44 propagating along the free beam path 40 enters the wedge prism through a first facet 60 and exits through a second facet 62. Thus, with the wedge prism 12 in the active position the light signal 44 propagates along the free beam path 40 only up to the wedge prism and then propagates along the guided beam path 42. In doing so, the light signal 44 undergoes refraction in accordance with Snell's law at both facets 60 and 62.

The first facet 60 of wedge prism 12 is oriented at an angle, $\alpha$, with respect to a normal 64 to the optical axis 23 of the lens element 38. The second facet 62 is inclined at an angle, $\beta$, with respect to the first facet 60. The remaining two facets 66, 68 of the wedge prism 12 are not used and thus can be parallel, as shown. The light signal 44 is refracted in the wedge prism 12 and undergoes a shift by an offset 70 and a rotation by an angle such that the lens element 38 couples the light signal 44 into the second fiber 36. As illustrated, the angular rotation is equal to 2δ and the light signal 44 is incident on the lens element 38 at angle −δ. The amount by which the second facet 62 is inclined to the first facet 60, i.e., the angle β and the amount of offset 70, are the two parameters controlling this refraction process.

Advantageously, the wedge prism 12 is not very sensitive to variations in angle α, variations that cause only small changes in the angular rotation. Accordingly, changes in angle α cause only small changes in the angle δ.

The amount of offset 70 is controlled by adjusting the position of the wedge prism 12 along the axis y. For example, shortening the path of the signal 44 in the wedge prism 12 by moving the wedge prism in the positive y direction decreases the offset 70. Similarly, lengthening the path of the signal 44 in the wedge prism 12 by moving it in the negative y direction increases the offset 70. The advantage of controlling the offset 70 in this manner is that it allows for large alignment tolerances. In fact, the offset 70 can be controlled even after assembly of the switch by adjusting the y-position of the wedge prism 12. This advantageously makes mechanical optical switches using the wedge prism 12 easier to assemble, and more stable and reliable in use.

To improve the performance of the mechanical optical switch 10, the wedge prism 12 may be designed to preserve the following relationship between angles α, β, and δ:

$$\sin^{-1}\{n \sin[\sin^{-1}[1/n \sin(\alpha-\delta)]+\beta]\}=\alpha+\beta+\delta,$$

where n is the refractive index of the wedge prism 12. The angle δ typically is kept low, e.g., on the order of 5° or less. Thus, a change in the angle α will typically alter the angle δ by about 5% or less. Under these circumstances, optical alignment is not very sensitive to the position accuracy of the wedge prism 12. Therefore, mechanical, thermal or other perturbations affecting the position of the wedge prism 12 will not significantly affect its ability to guide and couple the light signal 44 from the input fiber 16 to the second fiber 36. This insensitivity to mechanical perturbations advantageously further increases the stability and reliability of mechanical optical switches that use the wedge prism 12.

To achieve high-precision coupling of the light signal 44 into the fibers 34 and 36, the input port 14 may be tilted or inclined with respect to the optical axis 23. The amount of inclination is regulated on a case-by-case basis until optimal coupling efficiencies are obtained for the light signal 44 that propagates along the free beam path 40 and the guided beam path 42. This adjustment is important when the fibers 34 and 36 are single-mode, or when all fibers, including the fiber 16 are single-mode.

FIGS. 3A–B illustrate the operation of the optical elements of the switch. FIG. 3A shows the wedge prism 12 in the inactive position where the wedge prism 12 is moved out of the plane of the paper along the z-axis. This is indicated by the wedge prism 12 being drawn in dashed and dotted lines. The light signal 44 from the fiber 16 propagates along the free beam path 40 and is coupled into fiber 34. FIG. 3B shows the wedge prism 12 in the active position. The light signal 44 from the fiber 16 propagates along the guided beam path 42 and is coupled into fiber 36.

The wedge prism 12 can be removed from the free beam path 40 along any direction. Thus, the wedge prism 12 can be, for example, displaced along the Z-axis or displaced laterally along the y-axis until it is no longer in the free beam path 40. As indicated above, small lateral adjustments of the position of the wedge prism 12 along the y-axis can be used to control the offset 70.

Referring to FIG. 4, a mechanical optical switch 73 can be fabricated in accordance with the teaching set forth above with respect to the mechanical optical switch 10. The mechanical optical switch 73 includes the optical elements described above and the same reference numerals are used to refer to the same parts. The mechanical optical switch 73 includes a housing 75 for mounting the optical elements. The wedge prism 12 is positioned on a mechanical stage 80 and an actuator mechanism 85, such as a solenoid, is used to displace the stage 80 in the lateral direction along the y-axis for tuning of the offset 70. The stage 80 also has an internal mechanism for moving the wedge prism 12 along the z-axis. In particular, the stage 80 includes a z-adjustment to allow it to move the wedge prism 12 down and out of the free beam path 40. The stage 80 is capable of rapidly moving the wedge prism 12 in and out of the free beam path 40 to switch the light signal 44 between the fibers 34 and 36. The actuator mechanism 85, as well as the mechanism for z-axis control of the stage 80, can be any suitable mechanical actuator, electromechanical actuator, magnetic actuator, or piezoelectric actuator. For example, the actuator 85 and the z-adjustment can be a relay, a solenoid, or a drive motor.

As described above, a mechanical optical switch can be used to switch light between two optical fibers by varying the position of a lens element. Similarly, as described below, a mechanical optical switch can be used in other switching patterns, such as in a 2×2 switch, again, by varying the position of a lens element. For example, referring to FIGS. 5a and 5b, a dual add/drop 2×2 switch (switch 100) includes a first group 103 of input fibers and a second group 104 of output fibers. The first group 103 includes four signal or input fibers 105. Relative to a side orientation of the switch 100, the input fibers 105 are differentiated as a front layer that includes two fibers 105a and 105b, and a rear layer that includes two fibers 105c and 105d. Again relative to a side orientation of the switch 100, the second group 104 includes four output fibers 110 that are differentiated as a front layer that includes two fibers 110a and 110b, and a rear layer that includes two fibers 110c and 110d. The switch 100 also includes an input port and an output port (not shown), both of which may be in the form of a glass capillary. As in FIGS. 1–4 above, the fibers 105 and 110 are coupled or mounted in respective bores or holes in the capillary (not shown). For the sake of simplicity of the figures, neither ports nor capillaries are shown in FIGS. 5a and 5b.

The switch 100 further includes a first lens element 115 and a second lens element 120. Each lens element functions as a collimator to render divergent or convergent rays more nearly parallel. The lens elements 115, 120 can be, for example, a GRIN lens. A wedge prism 125 that functions to change beam paths of light signals is positionable between the two lens elements 115, 120. The wedge prism 125 is made of a material having a uniform refractive index n, such as, for example, quartz or glass. A free beam path 130 is defined when the wedge prism 125 is not positioned between the lens elements 115, 120. As illustrated in FIG. 5a, the free beam path 130 is made up of a first coupling arrangement 139 of the four light signals 132, 134, 136, and 138 formed between the pairs of fibers 105a–110d, 105b–110c, 105c–110b, and 105d–110a, respectively.

The wedge prism 125 can be moved in such a manner that in a first position it is not positioned within the free beam path 130 (FIG. 5a) and in a second position it is positioned within the free beam path 130 (FIG. 5b) (i.e., the active position). Positioning the wedge prism 125 in the active position results in a guided beam path 140 that has a second coupling arrangement 141 of the light signals passing between the two lens elements 115, 120. The second coupling arrangement 141 consists of two light signals formed between the pairs of fibers 105a–110b and 105b–110a. As will be discussed in greater detail below, the light signals 132, 134, 136, and 138 enter the wedge prism 125, converge, and produce light signals 142 and 144 exiting the wedge prism 125. As such, there is no output to fibers 110c and 110d from the lens element 120. In summary, when the wedge prism 125 is placed within the free beam path 130 (i.e., in the active position), the four light paths propagating along the free beam path 130 enter the wedge prism 125 through a first facet 145 and exit through a second facet 150. With the wedge prism 125 in the active position, the four light signals 132, 134, 136, 138 propagate along the free beam path 130 only up to the wedge prism 125 and then propagate through the wedge prism and up to the lens element 120 along the guided beam path 140. In so doing, the four light signals 132, 134, 136, 138 undergo refraction in accordance with Snell's law at both facets 145 and 150, producing output light signals to only two fibers 110a and 110b.

Referring to FIGS. 6a and 6b, the first facet 145 of the wedge prism 125 is oriented at an angle, α, with respect to a normal 160 to an optical axis 165 of the lens element 120. The second facet 10 is inclined at an angle, β, with respect to the first facet 145. A pair of remaining facets 170, 175 of the wedge prism 125 is not used and can thus be parallel, as shown. The light signals 132, 134 are refracted in the wedge prism 125 and undergo a shift by an offset 180 and rotation by an angle such that the lens element 120 couples the combination of the light signal 132 and light signal 144 into the second fiber 110b. (For simplicity, the light beams 134 and 142 are not illustrated, although the corresponding angles are the same.) In this case, the angular rotation is equal to 2δ and the light signal 144 is incident on lens element 120 at an angle −δ. The parameters controlling this refraction process relate to the amount by which the second facet 150 is inclined to the first facet 145, i.e., angle β and the amount of offset 180.

For the wedge prism 125, changes in the angle α cause only small changes in the angle δ. The amount of offset 180 is controlled by adjusting the position of the wedge prism 125 along the axis y. Shortening the path of the light signal 132 in the prism wedge 125 by moving the prism wedge in the positive y direction decreases offset 180. Lengthening the path of the light signal 132 in the wedge prism by moving it in the negative y direction increases the offset 180. The advantage of controlling the offset 180 in this manner is that it allows for large alignment tolerances. In fact, the offset 180 can be controlled even after assembly of the switch by adjusting the y-position of the wedge prism 125. This makes optical switches using the wedge prism easier to assemble, and more stable and reliable in operation.

Referring to FIGS. 7a and 7b, a mechanical optical switch 200, illustrated as a 1×2 optical switch, includes a first group 205 of signal or input fibers, a second group 210 of output fibers, a first lens element 215, a second lens element 220, and a wedge prism 225. The first group 205 includes an array of two signal or input fibers 230a and 230b. The second group 210 includes an array of four output fibers, 235a, 235b, 235c, and 235d. In one implementation, the output array is half the pitch of the input array. As such, there are twice as many output fibers as there are input fibers.

The switch 200 also includes an input port and an output port, both of which may be in the form of a glass capillary, as described above, but for simplicity of the figures are not shown. As in FIGS. 1–4 above, the input fibers 230a, 230b and the output fibers 235a, 235b, 235c, 235d are coupled or mounted in respective bores or holes in the capillary.

In the manner described above, each lens element 215, 220 functions as a collimator to render divergent or convergent rays more nearly parallel. The lens elements 215, 220 can be, for example, a GRIN lens. A wedge prism 225 that functions to change beam paths of light signal is positionable between the two lens elements 215, 220. As described above, the wedge prism 225 is made of a material having a uniform refractive index n. A free beam path 240 is defined when the wedge prism 225 is not positioned between the lens elements 215, 220. As illustrated in FIG. 7a, the free beam path 240 is made up of a first coupling arrangement 245 defined by two light signals 250 and 255 formed between pairs of fibers 230a–235d and 230b–235b, respectively. As such, in the first coupling arrangement 245 there is no light signal input that is coupled to fibers 235a and 235c from the wedge prism 225 and the second lens element 220.

The wedge prism 225 can be moved in such a manner that in a first position it is not positioned within the free beam path 240 (FIG. 7a) and in a second position it is positioned within the free beam path 240 (FIG. 7b) (i.e., the active position). Positioning the wedge prism 225 in the active position results in a guided beam path 260 that has a second coupling arrangement 265. The second coupling arrangement 265 is defined by two light signals that are formed between pairs of fibers 230a–235c and 230b–235a. Light signals 250 and 255 enter the wedge prism 225 and light signals 270 and 275 exit the wedge prism. As such, in the second coupling arrangement there is no light signal input that is coupled to fibers 235b and 235d from the wedge prism 225 and the second lens element 220. In summary, when the wedge prism 225 is placed within the free beam path 240 (i.e., in the active position), the two light signal propagating along the free beam path 240 enter the wedge prism 225 through a first facet 280 and exit through a second facet 285. With the wedge prism 225 in the active position, the two light signals 250, 255 propagate along the free beam path 240 only up to the wedge prism 225 and then propagate through the wedge prism and up to the lens element 220 along the guided beam path 260. In so doing, the two light signals 250, 255 undergo refraction in accordance with Snell's law at both facets 280 and 285. The refraction causes the focal points on the output array to be shifted by one pitch of the output array.

Although FIGS. 7a and 7b illustrate two input fibers and four output fibers, the number of input fibers can be more or less than two and the number of output fibers also can be more or less than four.

A number of embodiments of the invention have been described. Nevertheless, it will be understood that various modifications may be made without departing from the spirit and scope of the invention. For example, it is not necessary that the mechanical switch have two lens elements. Similarly, referring to FIGS. 8a–c, a mechanical switch 300 can be fabricated to include a segmented wedge prism. For example, the mechanical switch 300 includes a first group 305 of signal or input fibers, a second group 310 of output fibers, a first lens element 315, a second lens element 320, and a segmented wedge prism 325. The first group 305 includes an array of two signal or input fibers 330a and 330b. The second group 310 includes an array of six output fibers, 335a, 335b, 335c, 335d, 335e, and 335f. In this implementation, the output array is one third the pitch of the input array. As such, there are three times as many output fibers as there are input fibers.

The segmented wedge prism 325 includes a first segment 336 and a second segment 337 that is joined to the first segment 336. The first segment 336 includes an input facet 340 and an output facet 345, and the second segment 337 includes an input facet 350 and an output facet 355. The input facet 340 is oriented at an angle $\alpha_1$ with respect to a normal 360 to the optical axis 365 of the lens element 320. The output facet 345 is inclined at an angle $\beta_1$ with respect to the input facet 340. Similarly, the input facet 350 is oriented at an angle $\alpha_2$ with respect to the normal 360 to the optical axis 365 of the lens element 320. The output facet 355 is inclined at an angle $\beta_2$ with respect to the input facet 350.

The segmented wedge prism 325 can be positioned in three positions based on which, if either, segment is positioned within the free beam path. In particular, the prism 325 can be completely out of the beam path, the prism can be within the beam path such that the light signals contact the input facet 340 of the first segment 336, and the prism can be within the beam path such that the light beams contact the input facet 350 of the second segment 337. In this manner, the switch 300 can be used to switch between groups of output fibers by switching between: (a) a first group of light fibers 330a–335f and 330b–335c when the wedge prism 325 is removed; (b) a second group of light fibers 330a–335e and 330b–335b when the light signals contact input facet 340 (i.e., a first prism position 366); and (c) a third group of light fibers 330a–335d and 330b–335c when the light signals contact input facet 350 (i.e., a second prism position 367).

When the prism 325 is positioned in the first position 366, a light signal 370 from input fiber 330b is refracted in the segmented wedge prism and undergoes a shift by an offset 375 and a rotation such that the light signal is coupled into the output fiber 335b. When the prism 325 is positioned in the second position 367, the light signal 370 from the input fiber 330b is refracted in the prism and undergoes a shift by an offset 380 and a rotation such that the light signal is coupled into the output fiber 335a. Similar shifts occur with the light signal from the input fiber 330a such that the light signal is coupled into the output fibers 335e and 335d. Additional segments, input facets, and output facets can be used and the angles of the facets can be varied to control the output to the output fibers. As described above, a moving mechanism can be configured to move the segmented wedge prism 325 between the three positions. For example, the moving mechanism can be one or more of a mechanical actuator, an electromechanical actuator, a magnetic actuator, and a piezoelectric actuator. Accordingly, many modifications may be made by one of ordinary skill in the art without departing from the spirit and scope of the appended claims.

What is claimed is:

1. A method for switching between a first arrangement of light beams and a second arrangement of light beams formed between optical fibers, the method comprising:

forming a free beam path, wherein the free beam path comprises a first arrangement of light beams passing from a group of optical input fibers to a first group of optical output fibers;

and moving a wedge prism element into the free beam path, wherein moving the wedge prism into the free beam path shifts the light beams by an offset and rotates the light beams by an angle such that the light beams are coupled to a second group of optical output fibers in a second coupling arrangement.

2. A mechanical optical switch comprising:

a port adapted to receive a first group of optical fibers, the first group of optical fibers comprising two or more fibers;

a first lens element having an optical axis and being positioned in front of the first group of optical fibers;

a free beam path coupling light beams from a second group of optical fibers, the second group of optical fibers comprising two or more optical fibers, to the first lens element such that the light beams are coupled to the first group of optical fibers in a first coupling arrangement; and a beam guiding element configured to move into and out of the free beam path, wherein moving the beam guiding element into the free beam path shifts the light beams by an offset and rotates the light beams by an angle such that the light beams propagate to the first lens element and are coupled into the first group of optical fibers in a second coupling arrangement, and wherein in either the first or the second coupling arrangement, light from two fibers in the first group of optical fibers is coupled to a single fiber in the second group of optical fibers.

3. The mechanical optical switch of claim 2, wherein the first group of optical fibers comprises four fibers, the second group of optical fibers comprises two fibers, the free beam path comprises two beam paths formed between the second group of optical fibers and two fibers of the first group of optical fibers, and when the beam guiding element is moved into the free beam path the two beam paths are shifted to two different fibers of the first group of optical fibers.

4. The mechanical optical switch of claim 2, wherein the first group of optical fibers comprises four fibers, the second group of optical fibers comprises two fibers, the free beam path comprises four beam paths formed between the second group of optical fibers and the first group of optical fibers, and when the beam guiding element is moved into the free beam path the four beam paths are shifted such that two beam paths are formed between two of the second group of fibers and two different fibers of the first group of optical fibers.

5. The mechanical optical switch of claim 2, wherein the beam guiding element comprises a wedge prism having a first facet and a second facet and the light signals enter the wedge prism in the first facet and exit the wedge prism through the second facet.

6. The mechanical optical switch of claim 5, wherein the first facet is oriented at a first angle with respect to a line that is normal to an optical axis of the mechanical optical switch, and the second facet is oriented at a second angle with respect to the first facet.

7. The mechanical optical switch of claim 2, wherein the free beam path is inclined at an angle with respect to an optical axis of the mechanical optical switch.

8. The mechanical optical switch of claim 2, wherein the first lens element comprises a graded index lens.

9. The mechanical optical switch of claim 2, further comprising a second lens element positioned in front of the second optical fibers for collimating the light beams.

10. The mechanical optical switch of claim 2, wherein the second lens element comprises a graded index lens.

11. The mechanical optical switch of claim 2, further comprising a mechanical actuator configured to move the beam guiding element.

12. The mechanical optical switch of claim 2, further comprising an electromechanical actuator configured to move the beam guiding element.

13. The mechanical optical switch of claim 2, further comprising a magnetic actuator configured to move the beam guiding element.

14. The mechanical optical switch of claim 2, further comprising a piezoelectric actuator configured to move the beam guiding element.

15. The mechanical optical switch of claim 2, wherein the beam guiding element comprises a segmented wedge prism comprising a first segment and a second segment that is joined to the first segment, wherein moving the first segment of the beam guiding element into the free beam path shifts the light beams by the offset and rotates the light beams by the angle such that the light beams propagate to the first lens element and are coupled into the first group of optical fibers in the second coupling arrangement and moving the second segment of the beam guiding element into the free beam path shifts the light beams by a second offset and rotates the light beams by a second angle such that the light beams propagate to the first lens element and are coupled into the first group of optical fibers in a third coupling arrangement.

16. The mechanical optical switch of claim 15, wherein the first segment including a first input facet and a first output facet, and the second segment including a second input facet and a second output facet, and the first input facet is oriented at a first angle with respect to a normal to an optical axis of the first lens element and the first output facet is inclined at a second angle with respect to the first input facet.

17. The mechanical optical switch of claim 16, wherein the second input facet is oriented at a third angle with respect to the normal to the optical axis of the first lens element and the second output facet is inclined at a fourth angle with respect to the second input facet.

18. The mechanical optical switch of claim 17, wherein the first angle and the third angle are different.

19. A method for switching between a first arrangement of light beams and a second arrangement of light beams formed between optical fibers, the method comprising:

forming a free beam path, wherein the free beam path comprises a first coupling arrangement of light beams passing from a group of optical input fibers to a first group of optical output fibers;

and moving a beam guiding element into the free beam path, wherein moving the beam guiding element into the free beam path shifts the light beams by an offset and rotates the light beams by an angle such that the light beams are coupled to a second group of optical output fibers in a second coupling arrangement, wherein in either the first or the second coupling arrangement, light from two optical input fibers is coupled to a single optical output fiber.

20. The method of claim 19, further comprising moving the beam guiding element further into the free beam path to shift the light beams by a second offset and rotate the light beams by a second angle such that the light beams are coupled to a third group of optical output fibers in a third coupling arrangement.

21. The method of claim 19, wherein moving a beam guiding element into the free beam path comprises moving a wedge prism.

22. The method of claim 19, wherein moving the beam guiding element further comprises activating a mechanical actuator to move the beam guiding element.

23. The method of claim 19, wherein moving the beam guiding element further comprises activating an electromechanical actuator to move the beam guiding element.

24. The method of claim 19, wherein moving the beam guiding element further comprises activating a magnetic actuator to move the beam guiding element.

25. The method of claim 19, wherein moving the beam guiding element further comprises activating a piezoelectric actuator to move the beam guiding element.

26. A mechanical optical switch comprising:

a port adapted to receive a first group of optical fibers;

a first lens element having an optical axis and being positioned in front of the first group of optical fibers;

a free beam path coupling light beams from a second group of optical fiber to the first lens element such that the light beams are coupled to the first group of optical fibers in a first coupling arrangement; and a beam guiding element configured to move into and out of the free beam path, wherein moving the beam guiding element into the free beam path shifts the light beams by an offset and rotates the light beams by an angle such that the light beams propagate to the first lens element and are coupled into the first group of optical fibers in a second coupling arrangement, and wherein the beam guiding element comprises a segmented wedge prism comprising a first segment and a second segment that is joined to the first segment, wherein moving the first segment of the beam guiding element into the free beam path shifts the light beams by the offset and rotates the light beams by the angle such that the light beams propagate to the first lens element and are coupled into the first group of optical fibers in the second coupling arrangement and moving the second segment of the beam guiding element into the free beam path shifts the light beams by a second offset and rotates the light beams by a second angle such that the light beams propagate to the first lens element and are coupled into the first group of optical fibers in a third coupling arrangement.

27. The mechanical optical switch of claim 26, wherein the first segment including a first input facet and a first output facet, and the second segment including a second input facet and a second output facet, and the first input facet is oriented at a first angle with respect to a normal to an optical axis of the first lens element and the first output facet is inclined at a second angle with respect to the first input facet.

28. The mechanical optical switch of claim 27 wherein the second input facet is oriented at a third angle with respect to the normal to the optical axis of the first lens element and the second output facet is inclined at a fourth angle with respect to the second input facet.

29. The mechanical optical switch of claim 28 wherein the first angle and the third angle are different.

30. A method for switching between a first arrangement of light beams and a second arrangement of light beams formed between optical fibers, the method comprising:

forming a free beam path, wherein the free beam path comprises a first arrangement of light beams passing from a group of optical input fibers to a first group of optical output fibers;

moving a beam guiding element into the free beam path, wherein moving the beam guiding element into the free beam path shifts the light beams by an offset and rotates the light beams by an angle such that the light beams are coupled to a second group of optical output fibers in a second coupling arrangement;

and moving the beam guiding element further into the free beam path to shift the light beams by a second offset and rotate the light beams by a second angle such that the light beams are coupled to a third group of optical output fibers in a third coupling arrangement.

* * * * *